(12) United States Patent
Armacanqui et al.

(10) Patent No.: US 8,980,480 B2
(45) Date of Patent: Mar. 17, 2015

(54) LITHIUM PRIMARY CELL

(75) Inventors: M. Edgar Armacanqui, Madison, WI (US); Wen Li, Madison, WI (US); John Hadley, Madison, WI (US); Janna Rose, Madison, WI (US)

(73) Assignee: Spectrum Brands, Inc., Middleton, WI (US)

( * ) Notice: Subject to any disclaimer, the term of this patent is extended or adjusted under 35 U.S.C. 154(b) by 365 days.

(21) Appl. No.: 13/546,103

(22) Filed: Jul. 11, 2012

(65) Prior Publication Data

US 2013/0177801 A1 Jul. 11, 2013

Related U.S. Application Data

(60) Provisional application No. 61/509,689, filed on Jul. 20, 2011.

(51) Int. Cl.
```
H01M 6/16      (2006.01)
H01M 4/58      (2010.01)
H01M 4/06      (2006.01)
H01M 4/36      (2006.01)
H01M 6/50      (2006.01)
```

(52) U.S. Cl.
CPC ...... *H01M 4/58* (2013.01); *H01M 4/06* (2013.01); *H01M 4/364* (2013.01); *H01M 4/5815* (2013.01); *H01M 6/162* (2013.01); *H01M 6/168* (2013.01); *H01M 6/50* (2013.01)
USPC ........ 429/326; 429/209; 429/163; 429/218.1; 429/324; 429/131; 429/346

(58) Field of Classification Search
USPC ............. 429/326, 209, 163, 218.1, 324, 131, 429/346
See application file for complete search history.

(56) References Cited

U.S. PATENT DOCUMENTS

| | | | |
|---|---|---|---|
| 5,290,414 A | | 3/1994 | Marple |
| 6,280,883 B1 | * | 8/2001 | Lamanna et al. ............. 429/307 |
| 2003/0153680 A1 | * | 8/2003 | McBride et al. ................ 525/88 |
| 2005/0277023 A1 | * | 12/2005 | Marple et al. ................. 429/221 |
| 2008/0076022 A1 | | 3/2008 | Marple |
| 2009/0191466 A1 | | 7/2009 | Bowden et al. |

(Continued)

FOREIGN PATENT DOCUMENTS

| | | | |
|---|---|---|---|
| CN | 102024953 | * | 4/2011 |
| EP | 1829140 B1 | | 6/2008 |

(Continued)

OTHER PUBLICATIONS

CN102024953 MT.*
Extended Search Report on European Application 12175927.8, mailed Nov. 10, 2014.

*Primary Examiner* — Patrick Ryan
*Assistant Examiner* — Alex Usyatinsky
(74) *Attorney, Agent, or Firm* — Foley & Lardner LLP

(57) ABSTRACT

The present disclosure is directed to a primary electrochemical cell having an improved discharge performance, and/or improved reliability under physical abuse and/or partial discharge. More particularly, the present disclosure is directed to such a primary cell that comprises an improved cathode material comprising iron disulfide and a select pH-modifier and an improved non-aqueous electrolyte that comprises a solvent, a salt, pH-modifiers, and selected organic or inorganic additives, which improve cell stability and discharge performance.

7 Claims, 13 Drawing Sheets

(56) References Cited

U.S. PATENT DOCUMENTS

2010/0203370 A1 8/2010 Pozin et al.
2010/0248011 A1* 9/2010 Pozin et al. .................. 429/163

FOREIGN PATENT DOCUMENTS

| WO | WO-2009/104143 | 8/2009 |
| WO | WO-2010/111103 | 9/2010 |

* cited by examiner

LITHIUM PRIMARY CELL

CROSS-REFERENCE TO RELATED APPLICATION

This application claims priority from U.S. Provisional Patent Application Ser. No. 61/509,689, filed Jul. 20, 2011, the entire contents of which are incorporated herein by reference.

FIELD OF THE DISCLOSURE

The present disclosure is directed to a primary electrochemical cell having an improved discharge performance, and/or improved reliability under physical abuse and/or partial discharge. More particularly, the present disclosure is directed to such a primary cell that comprises an improved cathode material comprising iron disulfide and a select pH-modifier and an improved non-aqueous electrolyte that comprises a solvent, a salt, pH-modifiers, and selected organic or inorganic additives, which improve cell stability and discharge performance.

BACKGROUND OF THE DISCLOSURE

Electrochemical cells (or batteries) are used in a variety of electronic devices as a power source. Manufacturers continually try to increase the capabilities and features of these electronic devices, which in turn increases the demands on the batteries used therein. However, the size and shape of the batteries used in the devices are limited, or fixed, by the battery compartment within the devices. As a result, if, for example, the discharge performance or physical performance (e.g., resistance to leakage or crush strength) of the cell is to be improved, such improvements must be achieved by making internal improvements or refinements within the cell.

Accordingly, to-date, solutions to provide increased performance of the cell have included, for example, making refinements to the physical components of the cell. For example, the dimensions or thicknesses of various cell components may be modified in order to minimize the internal cell volume taken up by the housing, the seal or vent, as well as reducing the thickness of the separator between the anode and cathode. Such solutions are an attempt to maximize the internal volume of the cell that is available for active material.

In addition to, or as an alternative to, the modifications made in the physical features of the cell in an attempt to improve cell performance, the composition of various cell components, such as the cathode material, electrolyte, and/or anode material, may be modified in an attempt to increase cell performance. However, it is also to be recognized that the electrochemical processes or reactions that occur within the cell result in an increase of cathode thickness upon discharge, and an accompanying formation of reaction products. Further, as the discharge depth of the cell increases, additional reaction products will be generated, causing incremental volume increases of discharge products that need to be accommodated by incorporation of sufficient void volume within the cell.

In view of the foregoing, it is to be recognized that each refinement in cell design that brings with it an improvement in cell performance also creates a challenge (e.g., refined cathode material composition that increases discharge performance, which in turn places greater demands on void volume due to the increase in reaction products). Accordingly, a continuing need exists for a cell design that effectively balances these demands—that is, a need continues to exist for an improved cell design that optimizes output or discharge performance, internal void volume, and other physical demands (e.g., crush strength).

SUMMARY OF THE DISCLOSURE

Briefly, therefore, the present disclosure is directed to a primary electrochemical cell comprising a cell housing, an anode comprising lithium, a cathode comprising a cathode active material, the cathode active material comprising a mixture of iron disulfide and a pH-modifier selected from the group consisting of lithium carbonate, sodium silicate, ammonium carbonate, and ammonium bicarbonate, or a combination thereof, wherein said mixture has a pH within the range of about 5 to about 14, a separator disposed between the anode and the cathode and, a non-aqueous electrolyte in fluid communication with the anode, cathode and separator.

The present disclosure is also directed to a cathode for use in an electrochemical cell. The cathode comprises a cathode active material comprising a mixture of iron disulfide and a pH-modifier selected from the group consisting of lithium carbonate, sodium silicate, ammonium carbonate, and ammonium bicarbonate, or a combination thereof, wherein said mixture has a pH within the range of about 5 to about 14.

The present disclosure is further directed to a primary electrochemical cell comprising a cell housing, an anode comprising lithium, a cathode comprising a cathode active material, the cathode active material comprising iron disulfide, a separator disposed between the anode and the cathode, and, a non-aqueous electrolyte in fluid communication with the anode, the cathode and the separator, wherein said electrolyte comprises a solvent, a salt dissolved therein, and a pH-modifier, wherein said pH-modifier is (i) an organic additive selected from the group consisting of ethanolamine, diethanolamine, and 2-amino-2-methyl-1-propanol, or a combination thereof, or (ii) an inorganic additive selected from the group consisting of ammonium carbonate and ammonium bicarbonate or a combination thereof.

The present disclosure is also directed to a non-aqueous electrolyte for use in an electrochemical cell. The non-aqueous electrolyte comprises a solvent, a salt dissolved therein, and a pH-modifier, wherein said pH-modifier is (i) an organic additive selected from the group consisting of ethanolamine, diethanolamine, and 2-amino-2-methyl-1-propanol, or a combination thereof, or (ii) an inorganic additive selected from the group consisting of ammonium carbonate and ammonium bicarbonate or a combination thereof.

The present disclosure is still further directed to the primary electrochemical cell embodiments recited above, wherein the cell is size AA or AAA. The present disclosure is still further directed to such a AA cell, wherein the cell has an internal void volume of at least about 32%; alternatively, the present disclosure is still further directed to such a AAA cell, wherein the cell has an internal void volume of at least about 33.5%.

The present disclosure is still further directed to one or more of the primary electrochemical cell embodiments recited above, wherein the cell comprises a Positive Temperature Coefficient (PTC) device, wherein said device has a centrally-located hole having a diameter of at least about 5 mm.

The present disclosure is still further directed to one or more of the primary electrochemical cell embodiments recited above, wherein the cell comprises a gasket material comprising a copolymer or polymeric blend of polypropylene (PP) and ethylene propylene diene monomer (EPDM), and wherein the cell further comprises a separator material comprising polypropylene (PP) or polyethylene (PE) or a combination thereof.

BRIEF DESCRIPTION OF THE DRAWINGS

It is to be noted that corresponding reference characters indicate corresponding parts throughout the several views of the drawings.

It is also to be noted that the design or configuration of the components presented in these figures are not to scale and/or are intended for purposes of illustration only. Accordingly, the design or configuration of the components may be other than herein described without departing from the intended scope of the present disclosure. These figures should therefore not be viewed in a limiting sense.

DETAILED DESCRIPTION OF THE DISCLOSURE

In accordance with the present disclosure, an improved primary electrochemical cell has been discovered for improving discharge performance, while minimizing the risk of failure due to physical abuse and/or partial discharge. More specifically, it has been discovered that, through the proper selection of physical and chemical components of the cell, the discharge performance of the cell, as well as the ability of the cell to withstand physical abuse, can be improved. In particular, in accordance with the present disclosure, the chemical components of the cell that have been improved include, for example, (i) the cathode material, which comprises iron disulfide and a pH-modifier selected from among a particular list of options (as further detailed herein below), and/or (ii) the non-aqueous electrolyte, which comprises a solvent, a salt and an organic or inorganic additive selected from among a particular list of options (as further detailed herein below), which have been observed to improve discharge performance and stability of the cell. Additionally, or alternatively, the physical components of the cell that have been improved include, for example, (i) the electrode and/or cathode, which has dimensions designed to optimize void volume within the cell, and/or (ii) an improved gasket material, and more particularly an improved polymeric material from which the gasket is made, and/or (iii) a positive temperature coefficient (PTC) device, which has been observed to improve the performance of the cell, in terms of either improved safety, stability or physical performance of the cell (e.g., ability of the cell to withstand physical abuse).

Figure 1:
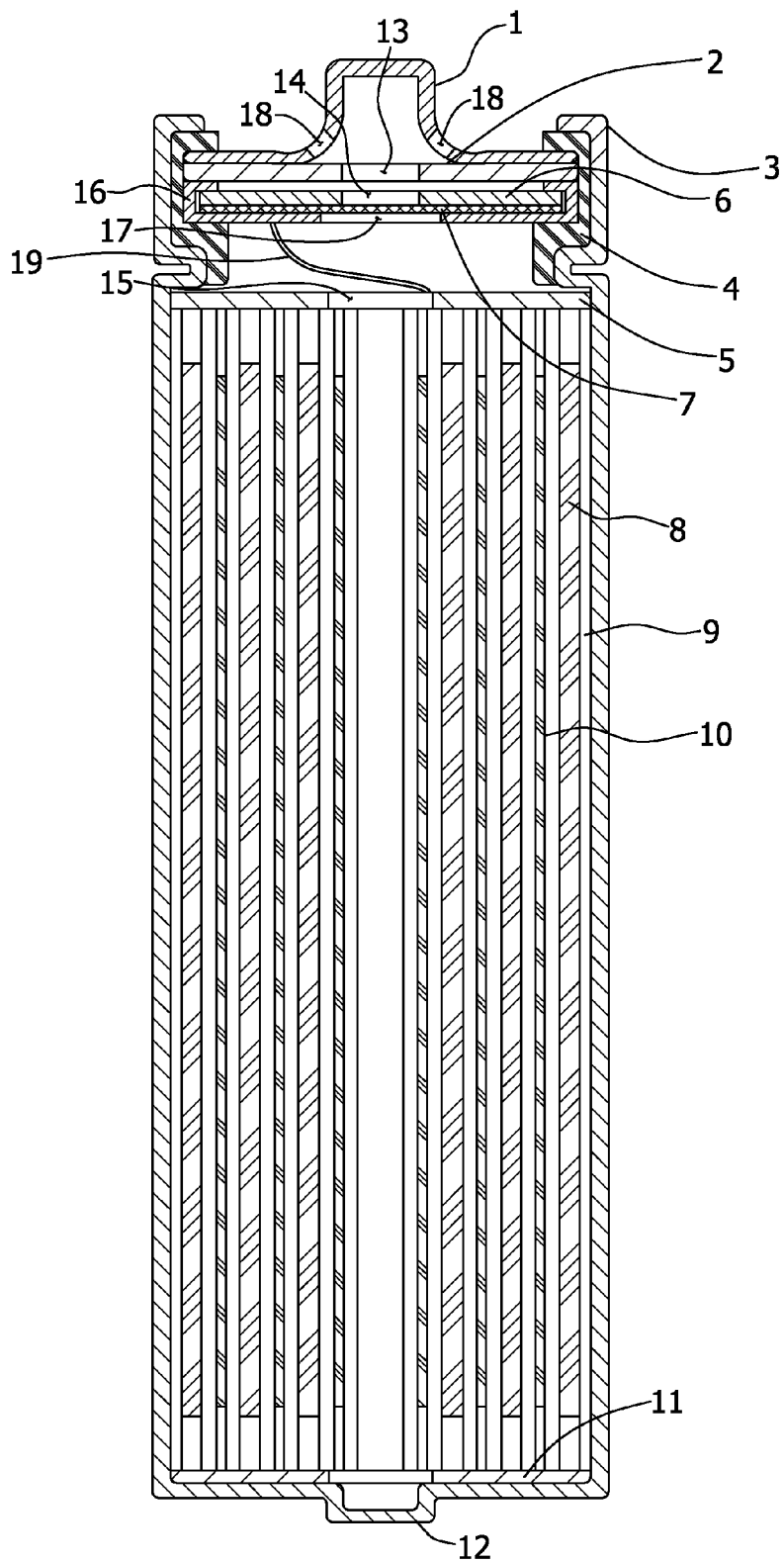
FIG. 1 is a cross-sectional, schematic view depicting an exemplary primary electrochemical cell of an embodiment of the present disclosure.
Figure 2:
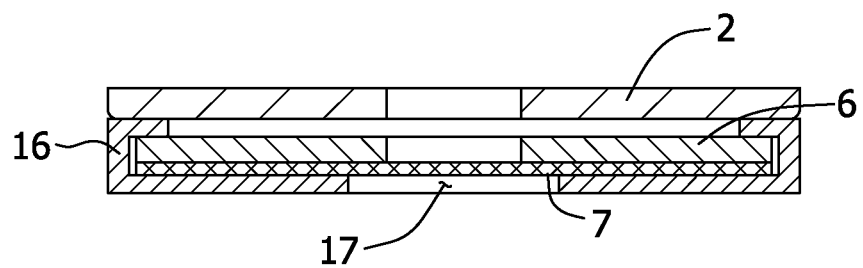
FIG. 2 is a cross-sectional, schematic view depicting the top portion of an exemplary primary electrochemical cell of an embodiment of the present disclosure.

It is to be noted that the electrochemical cell of the present disclosure may be configured in accordance or consistent with cell designs generally known in the art, but for the design improvements provided in detail herein below. For example, in various embodiments the electrochemical cells of the present disclosure may be designed to specifications suitable for a size AA or AAA battery. Accordingly, generally speaking, an exemplary embodiment of a cell of the present disclosure may be as illustrated in FIG. 1. Specifically, the cell may comprise a top cap 1, a PTC device 2, a cell housing 3, a sealing gasket 4, an insulating washer 5, a metal washer 6, a venting membrane 7, a separator 9, a cathode 8, an anode 10, an insulating bottom gasket 11, a housing bottom 12, and a contact cap 16. The top cap 1 may comprise one or more holes 18. Further, the PTC device 2, the insulating washer 5, the metal washer 6 and the contact cap 16 each contain a central hole (13, 15, 14 and 17 respectively). The central hole 14 on the metal washer 6 provides a venting path when the venting membrane 7 ruptures. The metal washer 6 central hole 14 can be, for example, less than about 5 mm in diameter. The central hole 15 of the insulating washer 5 provides access for the cathode tab 19 to be able to pass. The diameter of the central hole 15 of the insulating washer 5 will vary depending on the different cell design. With the exceptions detailed in the present disclosure, the various components of the electrochemical cell may, in general, be prepared of materials, and using techniques, generally known in the art.

A. Anode

The anode of the primary cell of the present disclosure comprises an anode active material, which in turn comprises alloyed or non-alloyed lithium. For example, in one embodiment the anode active material may be lithium in the form of a strip or foil. Though the composition of the lithium may vary, it is desirable to have lithium that is high in purity for use in the anode. In one embodiment of the present disclosure, the anode comprises about 99.9% lithium.

In certain embodiments of the present disclosure, the anode is an alkali metal and may desirably be non-alloyed lithium metal. In other embodiments of the present disclosure, the anode comprises non-alloyed lithium that may naturally contain trace amounts of one or more impurities (e.g., copper and/or aluminum). For example, the anode may comprise a copper impurity of from about 0.003 to about 0.005 wt. % or an aluminum impurity of from about 0.004 to about 0.006 wt. %.

In another embodiment of the present disclosure, the lithium may be alloyed with from about 0.10% to about 0.20%, preferably 0.15% of a metal, such as, for example, aluminum.

In this regard, it is to be noted that, as used herein, anode "active material" may refer to a single chemical compound that is part of the discharge reaction at the anode of a cell and contributes to the cell discharge capacity, including impurities and small amounts of other moieties that may be present therein. Thus, this phrase does not include current collectors, electrode leads, etc., that may contain or support the active material.

In other embodiments of the present disclosure, the anode may have a current collector either on the surface or within the lithium. When a current collector is present in the anode, any of various conductive metals may be used, such as copper, so long as the conductive metals are stable inside the cell.

The anode may further comprise an anode tab, which may be any anode tab known in the art that provides good electrical contact to the current collector. In a preferred embodiment, the anode tab comprises a nickel-plated steel. In another preferred embodiment, the anode tab comprises pure nickel.

As further noted herein below, the dimensions and/or composition of the anode may, in various embodiments, be optimized (alone or in combination with the cathode), in order to achieve a desired anode-to-cathode total ratio, and/or in order to achieve a desired void volume within the cell.

B. Cathode

The cathode of the present disclosure comprises a cathode active material. The cathode active material in turn comprises iron disulfide (e.g., natural pyrite), and optionally one or more additional electrochemically active materials, which can be in particulate form. In another embodiment of the present disclosure, the cathode active material may be selected from the group consisting of iron sulfide, copper sulfide, or a metal sulfide that possesses a similar working voltage to iron disulfide. In a preferred embodiment of the present disclosure, the concentration of iron disulfide in the cathode active material is from about 88 to about 98%, more preferably from about 90 to about 95%, and even more preferably about 92%, by weight of the cathode active material.

In this regard, it is to be noted that, as used herein, cathode "active material" may refer to a single chemical compound that is part of the discharge reaction at the cathode of a cell and contributes to the cell discharge capacity, including impurities and small amounts of other moieties that may be present therein. Alternatively, however, it may refer to a mixture of chemical compounds (when different compounds are used). For example, in accordance with the present disclosure, the active material may be iron disulfide (including various impurities that might be present therein), or a mixture of iron disulfide with one or more other compounds that participate in the discharge reaction. Thus, this phrase does not include current collectors, electrode leads, etc., that may contain or support the active material.

Typically, the iron disulfide is in particulate form, the particle size thereof being optimized in accordance with one or more embodiments of the present disclosure, in order to optimize cell performance. For example, in one embodiment of the present disclosure, the iron disulfide comprises particles having an average particle size of greater than about 20, 30 or 40 microns. In another embodiment of the present disclosure, the iron disulfide comprises particles having an average particle size of between greater than about microns and less than about 30 microns. In another embodiment of the present disclosure, the iron disulfide comprises particles having an average particle size of between greater than about 30 microns and less than about 40 microns. In another embodiment of the present disclosure, the iron disulfide particles comprise particles having a bi-modal or multi-modal distribution representing blends of fine and coarse particles. That is, these particles can be, for example, blends of particles having an average particle size below 15 microns with particles having an average particle size above 20 microns. Further, the average particle size of iron disulfide in accordance with the present disclosure may be selected to impact high rate discharge tests by providing an adequate surface area.

It is to be noted that, as used herein, "average particle size" generally refers to the mean diameter of the volume distribution of a sample of a composition, which can be measured, for example, using means generally known in the art—such as, for example, using a Beckman Coulter LS230 Series Laser Diffraction Particle Size Analyzer with Micro Volume Module. For example, a sample of 1 g is weighed and placed into a 25 ml beaker and then 10 ml of deionized water and two drops of Aerosol OT surfactant (1% Aerosol OT concentration) are added. The solution is mixed and dispersed by sonication for about 5 minutes before 1 ml of the solution is then used for measurements. Generally, 3 parallel measurements are performed to get the average particle size value of the samples being tested.

It is to be further noted that the average particle size of the iron disulfide may be controlled or achieved using methods generally known in the art, including, for example, wet milling processes such as a media mill, or a dry milling process using a jet mill.

When the cathode active material comprises iron disulfide, the level of acidity in the cathode can impact the stability of a lithium primary electrochemical cell at room and high temperatures of storage (e.g., up to about 75° C.). This, in turn, can lead to undesirable reactions at the lithium surface that lead to gassing and cell bulging during storage. In order to minimize cell instability, pH-modifiers can be added to the cathode active material. Further, pH-modifiers may be added to the electrolyte solution in order to improve cell stability after high temperature storage, such as, for example, at 60° C. One-week of storage at this temperature can lead to performance decline.

Accordingly, in one or more embodiments of the present disclosure, the cathode active material comprises a mixture of iron disulfide and a pH-modifier. The pH-modifier can be selected from the group consisting of lithium carbonate, sodium silicate, ammonium carbonate, ammonium bicarbonate, magnesium oxide, calcium oxide, or a combination thereof. In a preferred embodiment of the present disclosure, the pH-modifier is selected from the group consisting of lithium carbonate, sodium silicate, ammonium carbonate, ammonium bicarbonate, or a combination thereof, and even more particularly is lithium carbonate.

When present in the cathode mixture, the pH-modifiers modify the pH of the mixture. If the pH of the cathode mixture is too acidic (e.g., pH of between about 1 to about 4), the cell can become unstable. Preferably, then, the pH-modifier will be present at a concentration sufficient to modify the pH of the cathode mixture to be within the range of about 5 to about 14, and preferably from about 7 to about 14, even more preferably from about 10 to about 12. Typically, therefore, the concentration range of the pH-modifier can be from about 0.5% to about 6% or from about 1% to about 4%, and preferably about 2%, by weight of the cathode mixture.

In this regard, it is to be noted that the pH of, for example, (a) iron disulfide, or (b) a mixture of iron disulfide and a pH-modifier, respectively, suspended in water, can be determined by the following method: (i) place carbon dioxide-free deionized water into a beaker; (ii) while stirring the water, pH is measured with a pH meter and adjusted as necessary to a pH of 6.9 to 7.1 with dilute NaOH solution; (iii) place 5.0 g sample of (a) iron disulfide, or (b) a mixture of iron disulfide and pH-modifier compound, into a 100 ml beaker, and add 50 ml of the pH-adjusted water; and (iv) while stirring the same and water (vigorously enough to maintain the majority of the same in suspension without causing the water to cavitate), measure the pH at 30-second intervals until it stabilizes, recording the stable pH value as the pH of (a) the iron disulfide, or (b) the mixture of iron disulfide and pH-modifier compound.

Additional components may be present in the cathode, including, for example, a binder material and a conductive material. Preferred binder materials include polyvinylidene fluoride (PVDF) and polytetrafluoroethylene (PTFE). The binder materials may be present in an amount of between, for example, about 1% to about 5%, or about 1.5% to about 4%, and preferably about 2%, by weight of the cathode mixture.

Preferred conductive materials for use in the present disclosure include graphite and acetylene black. The conductive materials may be present in an amount of between about 1% to about 5%, preferably about 4%, by weight of the cathode mixture. In a preferred embodiment of the present disclosure, the cathode comprises about 1.5% graphite and about 2.5% acetylene black, by weight of the cathode mixture.

The cathode may also comprise a current collector. The current collector may comprise, in one or more embodiments: aluminum (from, for example, about 99.4 to about 99.5 wt. %), copper (of, for example, about 0.001 wt. %), manganese (from, for example, about 0.001 to about 0.006 wt. %), magnesium (of, for example, about 0.001 wt. %), nickel (from, for example, about 0.001 to about 0.003 wt. %), zinc (from, for example, about 0.014 to about 0.019 wt. %), titanium (from, for example, about 0.009 to about 0.017 wt. %) and/or a combination of silicon and iron (from, for example, about 0.483 to about 0.536 wt. %), or some combination of these components.

Additionally, the cathode may comprise a cathode tab, located, for example, in the middle of the cathode (i.e., approximately ⅓ from the center when using a jelly roll technique). In one embodiment, the cathode tab can be welded onto the section of the cathode that can be uncoated widthwise on the edge or in the middle of the cathode. Further, the cathode may also comprise more than one section that is not coated widthwise by the cathode active materials. In a preferred embodiment, the cathode tab comprises nickel and/or iron, such as, for example, stainless steel.

As further noted herein below, the dimensions and/or composition of the cathode may, in various embodiments, be optimized (alone or in combination with the anode), in order to achieve a desired anode-to-cathode total ratio, and/or in order to achieve a desired void volume within the cell.

C. Non-Aqueous Electrolyte

The electrochemical cell of the present disclosure further comprises a non-aqueous electrolyte in fluid communication with the anode, the cathode and a separator present between the anode and cathode. Generally speaking, the electrolyte, which preferably contains favorable electrochemical properties, is selected to ensure suitable compatibility with the highly reactive anode materials (e.g., lithium) and high energy density cathode materials (e.g., iron disulfide).

In this regard, it is to be noted that aqueous electrolytes are typically precluded from use because the anode materials may be active enough to chemically react with water. Accordingly, as used herein, a "non-aqueous" electrolyte generally refers to an electrolyte having a water concentration of less than about 50 ppm, preferably less than about 30 ppm (i.e., parts water per million parts total electrolyte).

The electrolyte of the present disclosure comprises a solvent and a solute dissolved therein. Though many solvents and solutes are known in the art and may in general be used as the non-aqueous electrolyte in a primary electrochemical cell, preferably the particular combinations of solvents and solutes of the present disclosure are selected to provide improved stability at low (e.g., from about −40° C. to about 0° C.) and high temperatures (e.g., from about 40° C. to about 75° C.). In one particular embodiment, the proper selection of solvents and solutes disclosed herein is made in order to improve low temperature performance of electrochemical cells.

In one preferred embodiment of the present disclosure, the solute comprises a lithium salt, or other suitable salts known in the art to be useful in lithium cells, dissolved in the solvent. Suitable lithium salts that may be used in the electrolyte include lithium iodide, lithium nitrate, lithium bis(trifluoromethanesulfonyl)imide ("LiTFSI") and mixtures of two or more thereof. In one particular embodiment of the present disclosure, the electrolyte comprises a lithium salt concentration of from about 0.5 to about 1.25 M, preferably from about 0.75 to about 1.0 M, the lithium salt being in particular LiTFSI. In another particular embodiment of the present disclosure, the electrolyte comprises at least two lithium salts, the concentration of a first salt (e.g., LiTFSI) being between about 0.15 and about 0.35 M and the concentration of a second salt (e.g., LiI) being between about 0.65 and about 0.85 M. In a particularly preferred embodiment of the present disclosure, the electrolyte solution comprises about 0.2 M LiTFSI and about 0.8 M LiI. In yet another particularly preferred embodiment of the disclosure, the electrolyte solution comprises about 0.3 M LiTFSI and about 0.6 M LiI. In any of these combinations or mixtures, the electrolyte may additionally comprise lithium nitrate. In particular, in a preferred embodiment, the electrolyte solution comprises from about 0.6 to about 0.9 M LiTFSI and from about 0.02 to about 0.4 M lithium nitrate, preferably about 0.85 M LiTFSI and about 0.1 M lithium nitrate. More particularly, in yet another preferred embodiment of the present disclosure, the salt is lithium nitrate alone or in combination with at least one other salt.

Selection of a suitable solvent that may be used in the electrolyte of the present disclosure is at least in part dependent upon the desired solute, and more particularly the solubility of the desired solute in the solvent. Typically, the solvent is free from acyclic ethers. In a preferred embodiment, the solvent is selected from: 1,3-dioxolane, propylene carbonate, sulfolane, 3,5-dimethylisoxazole, and mixtures of two or more thereof. In a preferred embodiment of the present disclosure, the solvent comprises a cyclic solvent mixture of dioxolane, sulfolane and 3,5-dimethylisoxazole. The mixture of dioxolane, sulfolane and 3,5-dimethylisoxazole can comprise, by volume of the electrolyte mixture: from about 60% to about 70%, preferably about 65% and more preferably about 61%, dioxolane; from about 30% to about 40%, preferably about 35% and more preferably about 39%, sulfolane; and, from about 0.1% to about 0.5%, and preferably about 0.2%, 3,5-dimethylisoxazole. In another preferred embodiment of the present disclosure, the solvent comprises a mixture of dioxolane and sulfolane. The mixture of dioxolane and sulfolane can comprise, by volume of the mixture: from about 55% to about 70%, preferably about 65%, and even more preferably about 61% dioxolane; and, from about 30% to about 45%, preferably about 35%, and even more preferably about 39% sulfolane.

In order to minimize cell instability, pH-modifiers may be added directly to the electrolyte solution. With respect to the electrolyte solution, these additives can be organic or inorganic additives. Suitable organic additives that may be added to the electrolyte include ethanolamine, diethanolamine, and 2-amino-2-methyl-1-propanol. These additives may be present in the electrolyte solution either individually or with a combination thereof. When at least one organic additive is present in the electrolyte, the total additive(s) are present in an amount of from about 0.1% to about 2.0%, by weight of the electrolyte. When at least one organic additive is present in the electrolyte, the pH of the electrolyte is typically from about 5 to about 14, and preferably is from about 7 to about 14, more preferably from about 10 to about 12.

Inorganic additives may also be added directly to the electrolyte to minimize cell instability. These inorganic additives include ammonium carbonate, ammonium bicarbonate or a combination thereof. When at least one inorganic additive is present in the electrolyte, the additive(s) are present in an amount of from about 0.1% to about 5%, by weight of the electrolyte. When at least one inorganic additive is present in the electrolyte, the pH of the electrolyte is from about 5 to about 14, and preferably from about 7 to about 14, more preferably from about 10 to about 12.

In this regard, it is to be noted that pH may be measured using means generally known in the art, without departing from the intended scope of the disclosure provided herein.

D. Separator

The separator of the present disclosure is provided to maintain a physical dielectric separation of the cathode and the anode and allows for transport of ions between the two. Further, the separator acts as a wicking medium for the electrolyte and as a collar that prevents fragmented portions of the anode from contacting the cathode. The separator can be any known separator used in the art, without departing from the scope of the disclosure. However, in a preferred embodiment of the present disclosure, the separator comprises polyethylene. In another preferred embodiment of the present disclosure, the separator comprises polypropylene. In another preferred embodiment of the present disclosure, the separator comprises a tri-layer of polypropylene-polyethylene-polypropylene.

E. Gasket Seal Material

The electrochemical cell of the present disclosure additionally comprises a gasket seal, which is present to prevent electrolyte leakage. Accordingly, in general, selection of a suitable gasket material will be, at least in part, a function of the composition of the electrolyte to be used in the cell, the gasket seal being made from, or comprising, a material that is inert to the electrolyte.

Additionally, the gasket seal is made from, or comprises, a material that is capable of withstanding exposure to the cell environment for an extended period of time (e.g., suitably flexible and resistant, for example, to cold flow under pressure, such that it maintains a sufficiently effective seal under the conditions to which the cell is commonly exposed—e.g., operational conditions, as well as extended periods of storage).

In a preferred embodiment, however, the gasket seal of the present disclosure is prepared from a material that has shown reduced cell weight loss after high temperature storage (e.g., from about 140 to about 160° F.), as well as reduced electrolyte absorption. Specifically, in a preferred embodiment of the present disclosure, the gasket seal is prepared from a material comprising a copolymer of polypropylene and ethylene propylene diene monomer (EPDM). The density of this gasket seal material may range from about 0.9 to 1.0 g/cm$^3$, and preferably is about 0.95 g/cm$^3$. Additionally, the tensile strength of the gasket seal material may be from about 1700 psi to about 1800 psi, and preferably is about 1740 psi (at Yield—Across Flow (23° C.), as determined using means generally known in the art). The elongation of the gasket seal material may be from about 25% to about 35%, and preferably is about 31% (at Yield—Across Flow (23° C.), as determined using means generally known in the art, such as, for example, standard testing method ASTM D638). In another preferred embodiment of the present disclosure, the gasket comprises polypropylene.

F. Safety Device

In one embodiment of the present disclosure, the electrochemical cell further comprises a safety device, such as a Positive Temperature Coefficient (PTC) device, which in general is present within the cell to reduce current flow and protect against external short-circuiting or forced discharge. However, in accordance with the present disclosure, the PTC device may also offer protection under certain other electrical abuse conditions. Specifically, the PTC device may be effective by limiting the current flow when the electrochemical cell reaches a designed activation temperature of the PTC device. When the PTC device activates, the resistance thereof increases sharply, with a corresponding reduction in the flow of current and, consequently, internal heat generation. When the electrochemical cell and the PTC device cools (e.g., below about 60° C.), the resistance of the PCT device drops, thereby allowing the battery to discharge again. The PTC device will continue to operate in this manner for many cycles if an abusive condition continues or occurs again. The PTC device does not reset indefinitely; however, when it ceases to do so, the PTC device will be in a high-resistance condition.

In an exemplary embodiment of the present disclosure, the PTC device is made of, or comprises, a polymeric material, which in turn comprises a non-conductive crystalline organic polymer matrix that is loaded with carbon black particles, the concentration thereof being sufficient to make the PTC device conductive. When in a cool or cooling state, the polymer is crystalline; as a result, carbon is forced into the regions between crystals, thus forming various conductive chains. Because the PTC device is conductive, it will pass a given current, known in the art as a "hold current." If too much current is passed through the PTC device (i.e., known in the art as the "trip current"), the PTC device will begin to heat. As the PTC device heats up, the polymer will expand, changing from a crystalline state into an amorphous state. The polymeric expansion separates the carbon particles and breaks the conductive pathways, thus causing the resistance of the PTC to increase. This, in turn, causes the PTC device to heat faster and expand more, which further raises the resistance. The resulting increase in resistance substantially reduces the current in the circuit. A small current, however, continues to flow through the PTC device and is sufficient to maintain the temperature of the PTC at a level which will keep the PTC device in a high resistance state.

In a particularly preferred embodiment of the present disclosure, the PTC device has an inner hole, or more generally a hole centrally located along the radius of the generally circular device, that has a diameter that is equal to or greater than about 5 mm. Additionally, in one or more embodiments, the PTC device of the present disclosure has a thickness in the range from about 0.1 to about 0.5 mm, and preferably about 0.3 mm.

G. Cell Parameters

It is known in the art that the reliability of primary electrochemical cells typically decreases or deteriorates after partial discharge. Partial discharge induces the formation of discharge products which increases cathode thickness and consumes internal volume, making the cell more sensitive to failure during abuse testing (such as, for example, during a Crush and Impact test) due to, for example, an enhanced tendency to exhibit or experience internal electrical shorting between the anode and the cathode. To minimize the risk of failure due to physical abuse and/or partial discharge, the size or dimensions of the anode, the cathode, or both, of the electrochemical cells of the present disclosure have been modified to allow for adequate void volume without affecting cell performance.

In an exemplary embodiment of the present disclosure, a lithium-iron disulfide cell has the following overall discharge reaction:

| Anode | $4Li \rightarrow 4Li^+ + 4e$ |
| Cathode | $FeS_2 + 4e \rightarrow Fe + 2S^{-2}$ |
| Overall | $4Li + FeS_2 \rightarrow Fe + 2Li_2S$ |

Accordingly, during partial discharge of a cell, the discharge products that form are Fe and $Li_2S$.

When a partial discharge of a cell occurs, the cathode coating thickness increases due to the formation of discharged products. As a result, physical abuse of partially discharged cells may result in failure due to short-circuiting of the cells by, for example, electrical contact between electrodes if subjected to mechanical abuse followed by internal temperature rise and flaming of the electrolyte solvent.

Accordingly, in one embodiment of the present disclosure, the cell size of the electrochemical cell is selected from the group consisting of size AA and size AAA. Further, in order to reduce or eliminate the likelihood of failures due to, for example, physical abuse, the electrode dimensions are such that the void volume of a size AA cell is greater than about 30%, and preferably greater than about 32%, and more preferably about 34%; and the void volume of a size AAA cell is greater than about 30%, and preferably greater than about 33.5%, and more preferably about 34%. When the size AA and AAA cells comprise these amounts of void volume, the cells have showed an improvement in passing conventional physical abuse tests. Methods for measuring the void volume and the physical abuse capacity of cells are generally known in the art, as further illustrated in the examples of the present disclosure. For example, the void volume percentage of a cell may be calculated based on the actual volume of the cell housing minus the total volume of the electrolyte, the cathode, the anode, the anode tab (if present), the cathode tab (if present), the separator, an insulating tape (if present) and an insulating washer (if present).

Figure 13:
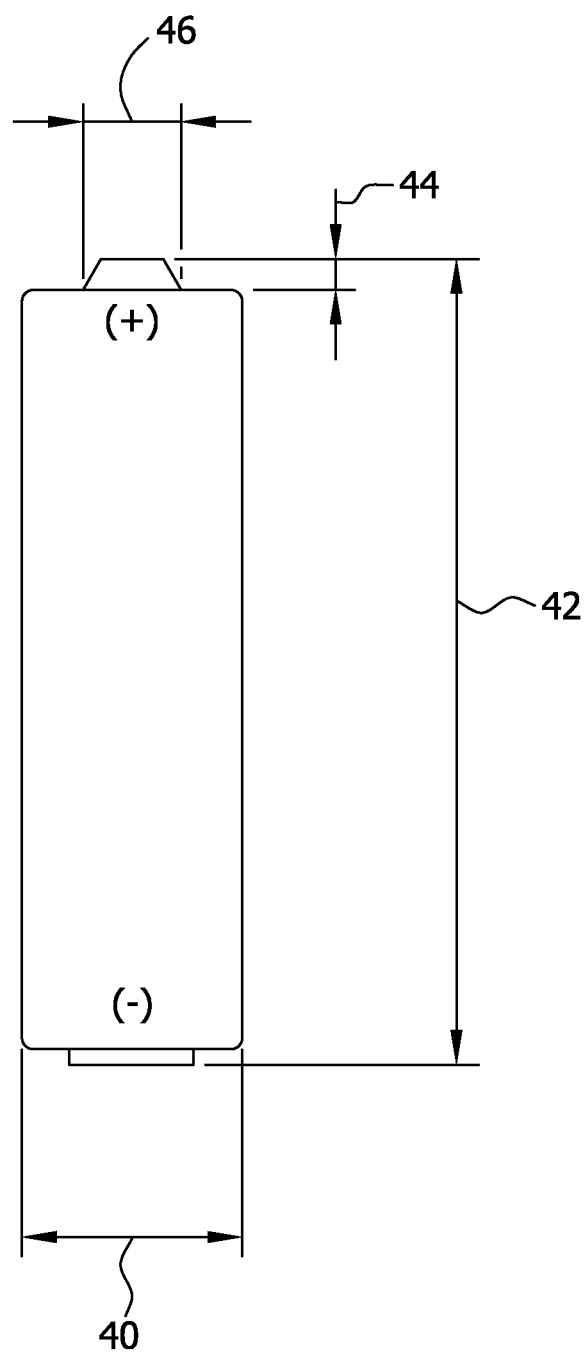
FIG. 13 is a cross-sectional, schematic view depicting the cell dimensions of an exemplary cell of the present disclosure.

With respect to the void volumes recited above, and with reference to FIG. 13 herein, it is to be noted that the cell dimensions of a AA or a AAA battery of the present disclosure have a diameter 40, an overall height 42, a nubbin height 44 and a nubbin diameter 46 as detailed herein. For size AA cells, the diameter 40 is about 13.5 to about 14.5 mm; the overall height 42 is about 49.5 to about 50.5 mm; the nubbin height 44 is about 1 mm or more; and, the nubbin diameter 46 is about 5.5 mm or less. For size AAA cells, the diameter 40 is about 9.5 to about 10.5 mm; the overall height 42 is about 43.5 to about 44.5 mm; the nubbin height 44 is about 0.8 mm or more; and, the nubbin diameter 46 is about 3.8 mm or less. The cell dimensions provide the space to accommodate the anode, the cathode, the electrolyte, the separator, the gasket material closure assembly, the current collectors, and other internal components that may be present, leaving adequate void volume to accommodate any electrode expansion that results due to discharge, as well as any gas formation, if present.

As noted, the electrode dimensions may be modified in one or more embodiments of the present disclosure, in order to provide an adequate void volume. In addition, or alternatively, it is to be noted that altering the dimensions of the anode, cathode, or both, may additionally impact the cell anode to cathode total ratio. The following parameters represent an exemplary embodiment of a cell of the present disclosure:

| Item | Parameter | Cell 1 | | Cell 2 | |
|---|---|---|---|---|---|
| Anode | Thickness | 0.184 mm | | 0.184 mm | |
| | Width | 3.70 cm | | 3.70 cm | |
| | Initial length | 25.80 cm | | 26.80 cm | |
| | Foil weight | 0.94 g | | 0.97 g | |
| | Total capacity | 3622 mAh | | 3762 mAh | |
| Cathode | Coating composition | FeS2 | 92% | FeS2 | 92% |
| | | Purity of FeS2 | 95% | Purity of FeS2 | 95% |
| | | carbon conductor | 4.00% | carbon conductor | 4.00% |
| | | Binder | 2.00% | Binder | 2.00% |
| | | Li2CO3 | 2.00% | Li2CO3 | 2.00% |
| | Coating width | 3.90 cm | | 3.90 cm | |
| | Coating weight | 4.87 g | | 4.97 g | |
| | Coating thickness in each side | 0.075 mm | | 0.075 mm | |
| | Cathode length | 28.70 cm | | 29.30 cm | |
| | Total capacity | 3804 mAh | | 3887 mAh | |

H. Method of Manufacturing

The primary electrochemical cells of the present disclosure may be manufactured by any suitable means known in the art without departing from the scope of the present disclosure. Suitable techniques include, for example, a "jelly roll" technique wherein the cell is manufactured by applying, drying, and pressing electrode active materials to opposite major surfaces of metal sheets, which are used as current collectors, cutting into the shape of a band having a predetermined width and length, and spirally winding the metal sheets, serving as an anode and a cathode, while disposing a separator between the anode and the cathode, in a helical shape. After insertion into the cell housing of the electrode assembly, a non-aqueous electrolyte is added to the cell. The anode, cathode, separator and electrolyte may then be sealed in the cell housing methods and components generally known in the art, including in one or more particular embodiments using the gasket sealing material and/or the PTC device detailed herein above. In one embodiment of the present disclosure, the cell is manufactured to allow extra cathode material in the center of the jelly roll to form a hard core. In yet another embodiment of the present disclosure, the method of manufacturing includes increasing the mandrel diameter to about 3.5 mm, which further increases the void volume of the cell.

The following Examples describe various embodiments of the present disclosure. Other embodiments within the scope of the appended claims will be apparent to a skilled artisan considering the specification or practice of the disclosure as described herein. It is intended that the specification, together with the Examples, be considered exemplary only, with the scope and spirit of the disclosure being indicated by the claims, which follow the Example.

EXAMPLES

The following non-limiting examples are provided to further illustrate the present disclosure.

In Examples 1-9, five different cells were tested. Test lot 45 was the control lot comprising electrolyte #45. Electrolyte #45 comprises the following components: 1,2-dimethoxyethane (about 16% v/v); 1,3-dioxolane (about 58% v/v); diglyme (about 12% v/v); lithium iodide (from about 9.5 to about 15 wt. %); LiTFSI (less than about 10 wt. %); 3,5-dimethylisoxazole (about 0.2% v/v); lithium nitrate (less than about 5 wt. %); and, less than about 50 ppm of water.

The electrolyte of test lot 113 comprised 1M LiTFSI, a solvent mixture of 65:35 by v/v (volume by volume) of 1,3-dioxolane and sulfolane with trace amounts (0.2 vol. %) of 3,5-dimethylisoxazole and less than about 50 ppm of water.

The electrolyte of test lot 114 comprised 1M (LiTFSI:LiI=1:2), a solvent mixture of 65:35 by v/v (volume by volume) of 1,3-dioxolane and sulfolane with trace amounts (0.2 vol. %) of 3,5-dimethylisoxazole and less than about 50 ppm of water.

The electrolyte of test lot 115 comprised 1M (LiTFSI:LiI=1:4), a solvent mixture of 65:35 by v/v (volume by volume) of 1,3-dioxolane and sulfolane with trace amounts (0.2 vol. %) of 3,5-dimethylisoxazole and less than about 50 ppm of water.

The electrolyte of test lot 116 comprised 1M (LiTFSI:LiI=1:4), a solvent mixture of 55:45 by v/v (volume by volume) of 1,3-dioxolane and sulfolane with trace amounts (0.2 vol. %) of 3,5-dimethylisoxazole and less than about 50 ppm of water.

The electrolyte of test lot 117 comprised 1M LiTFSI (22.3 wt. %), a solvent mixture of 61:39 by v/v (volume by volume) of 1,3-dioxolane (47.3 wt. %) and sulfolane (30.2 wt. %) with trace amounts (0.2 vol. %) of 3,5-dimethylisoxazole and less than about 50 ppm of water.

The electrolyte of test lot 118 comprised 0.88M LiTFSI (19.7 wt. %), a solvent mixture of 61:39 by v/v (volume by volume) of 1,3-dioxolane (48.9 wt. %) and sulfolane (31.2 wt. %) with trace amounts (0.2 vol. %) of 3,5-dimethylisoxazole and less than about 50 ppm of water.

In each of the test lots, including control lot #45, lithium carbonate was included in the cathode and the discharge performance of each test lot was measured at various temperatures and currents. In each graph, the discharge performance was measured by the cell voltage (V) or (mV) over discharge time (min) or (sec).

Example 1

Figure 3:
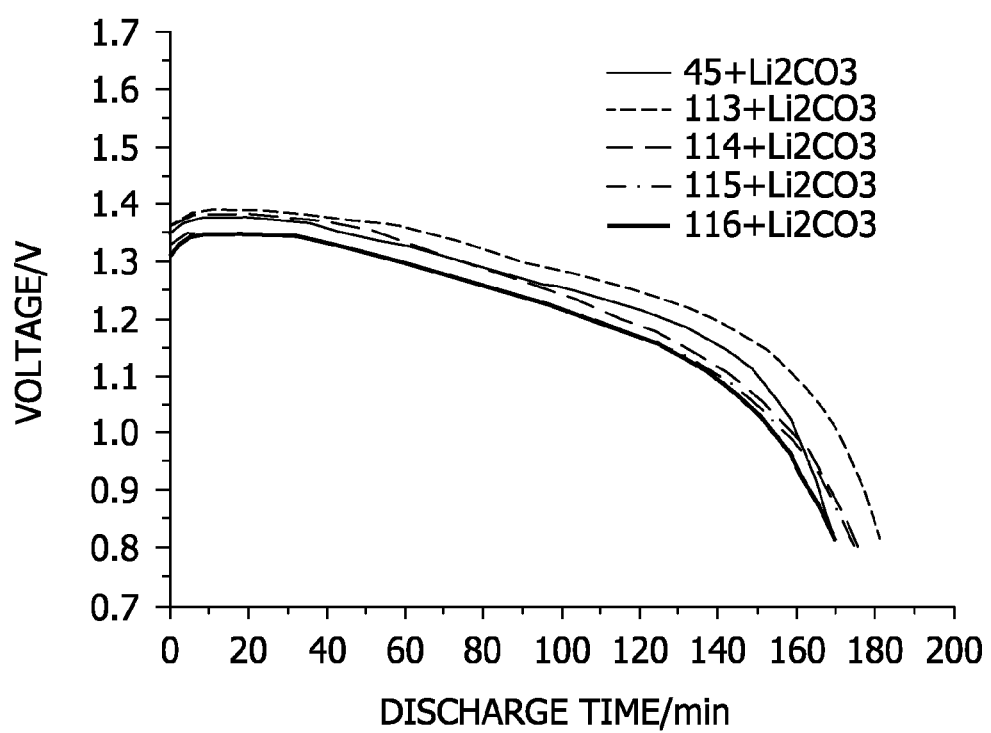
FIG. 3 is a graphical depiction of the discharge performance of exemplary cells of the present disclosure at 1000 mA current.

FIG. 3 displays the discharge performance of LFBAA model batteries (Li—FeS$_2$ AA batteries) comprising the five electrolytes and lithium carbonate. The discharge performance was measured at room temperature at 1000 mA current. As shown in FIG. 3, electrolyte 113 (comprising the 1M LiTFSI DXL:SUL 65:35 by v/v) displayed the longest discharge time over the highest voltage, as well as decreased cell weight loss, as discussed elsewhere throughout this disclosure.

Example 2

Figure 4:
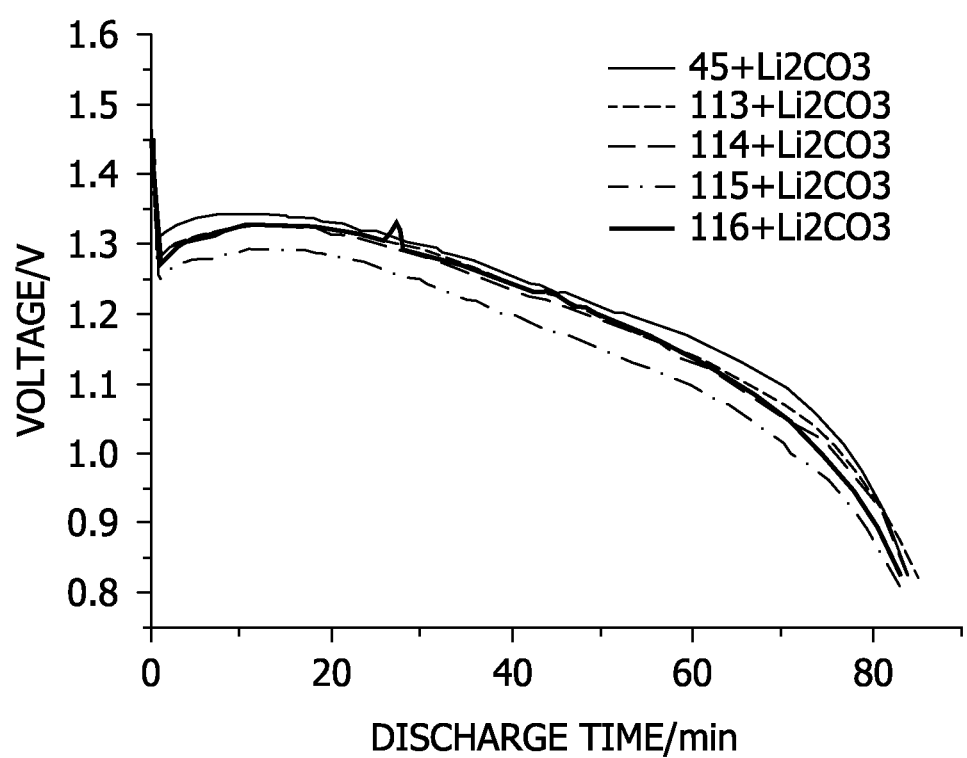
FIG. 4 is a graphical depiction of the discharge performance of exemplary cells of the present disclosure at 2000 mA current.

FIG. 4 displays the discharge performance of LFBAA batteries comprising the five electrolytes and lithium carbonate. The discharge performance was measured at room temperature at 2000 mA current. As shown in FIG. 4, though the electrolytes displayed a similar discharge performance, electrolytes 113, 114 and 116 performed better than electrolyte 115.

Example 3

Figure 5:
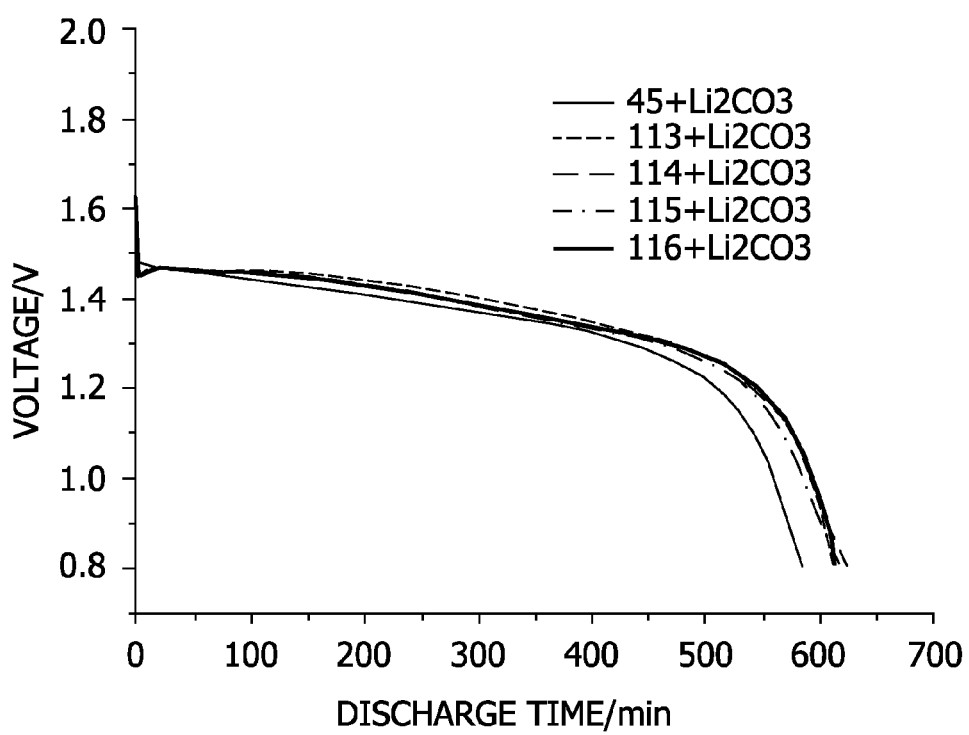
FIG. 5 is a graphical depiction of the discharge performance of exemplary cells of the present disclosure at 300 mA current.

FIG. 5 displays the discharge performance of LFBAA batteries comprising the five electrolytes and lithium carbonate. The discharge performance was measured at room temperature at 300 mA discharge current. As shown in FIG. 5, test electrolytes 113, 114, 115 and 116 displayed an improved discharge performance over the control electrolyte 45.

Example 4

Figure 6:
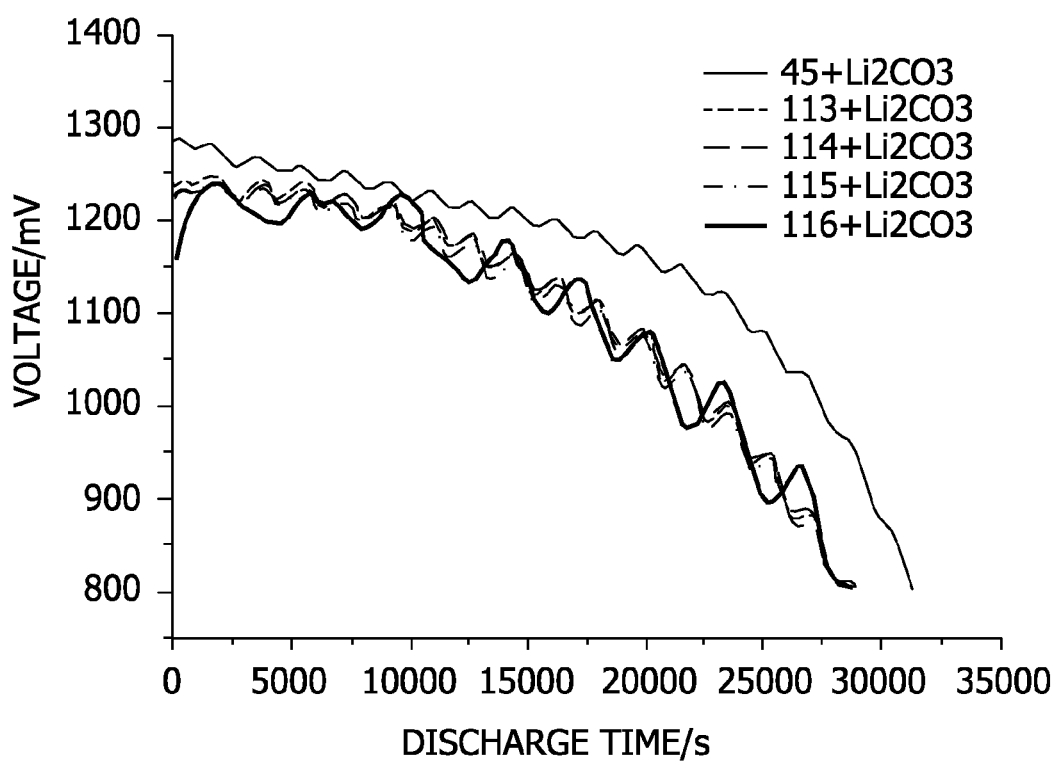
FIG. 6 is a graphical depiction of the discharge performance of exemplary cells of the present disclosure at 300 mA current at −20° C.

FIG. 6 displays the discharge performance of LFBAA batteries comprising the five electrolytes and lithium carbonate. The discharge performance was measured at −20° C. at 300 mA discharge current.

Example 5

Figure 7:
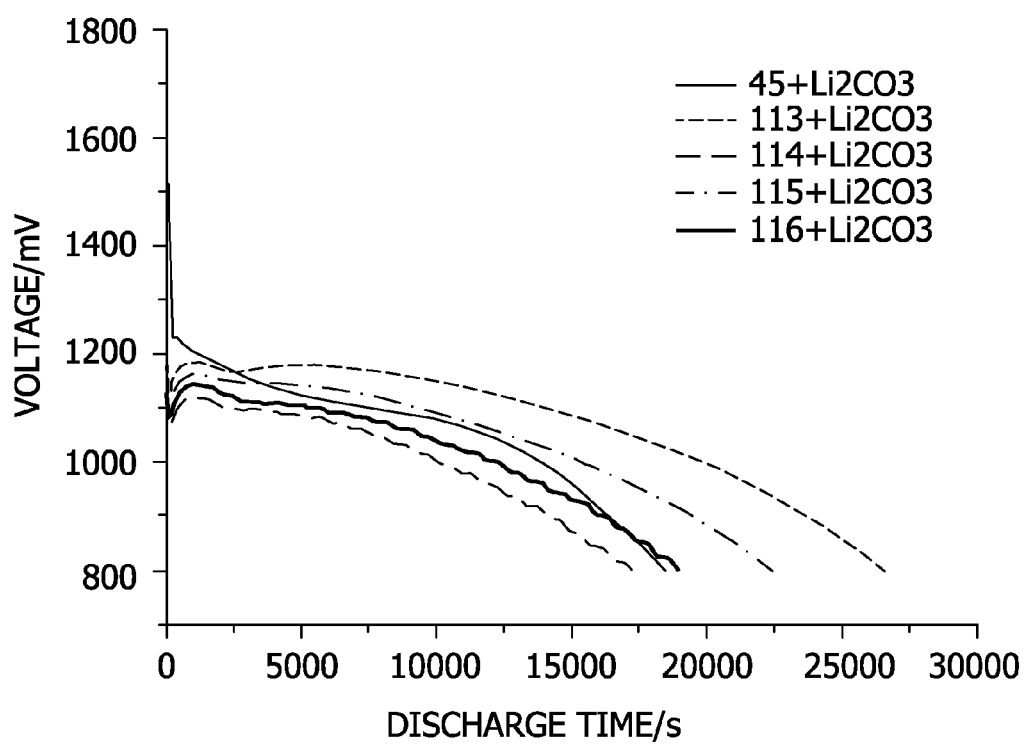
FIG. 7 is a graphical depiction of the discharge performance of exemplary cells of the present disclosure at 300 mA current at −40° C.

FIG. 7 displays the discharge performance of LFBAA batteries comprising the five electrolytes and lithium carbonate. The discharge performance was measured at −40° C. at 300 mA current. As shown in FIG. 7, electrolytes 113 and 115 displayed the best discharge performance at this low temperature.

Example 6

Figure 8:
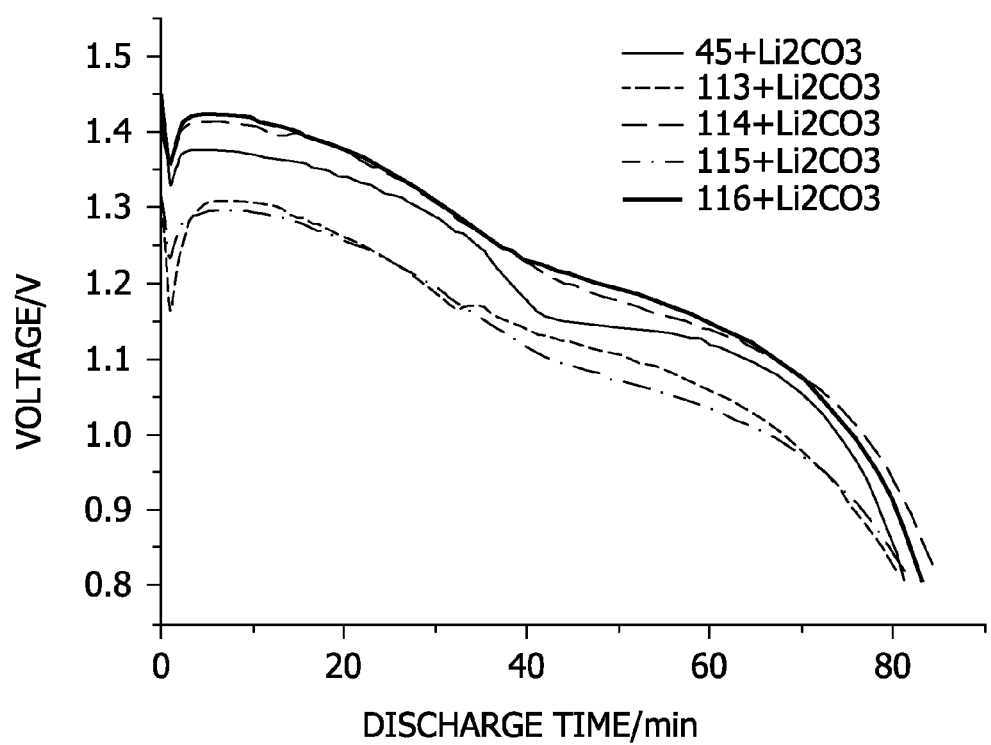
FIG. 8 is a graphical depiction of the discharge performance of exemplary cells of the present disclosure at 2000 mA discharge current at 60° C.

FIG. 8 displays the discharge performance of LFBAA batteries comprising the five electrolytes and lithium carbonate. The discharge performance was measured at 60° C. at 2000 mA current. As shown in FIG. 8, the electrolytes displayed a similar discharge performance; however, electrolytes 114 and 116 displayed the best discharge performance.

Example 7

Figure 9:
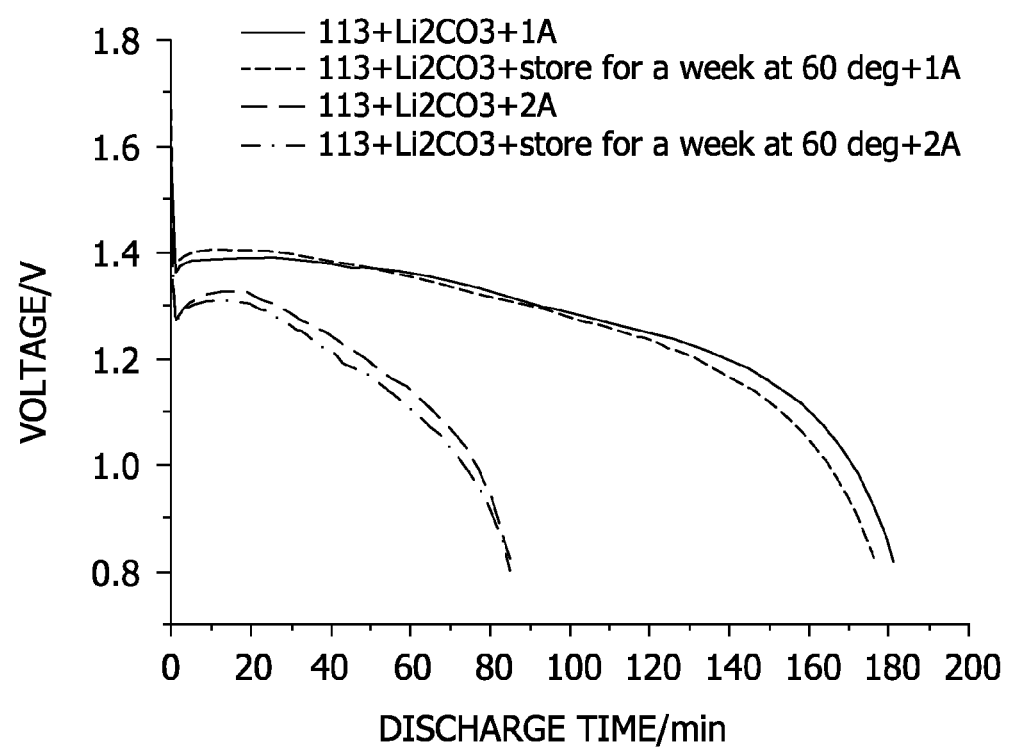
FIG. 9 is a graphical depiction of the discharge performance of exemplary cells of the present disclosure after one week of high temperature storage at 1000 mA or 2000 mA discharge current.

FIG. 9 displays the discharge performance of electrolyte 113 with lithium carbonate after one week of storage at high temperature (60° C.). As shown in FIG. 9, the batteries comprising electrolyte 113 and lithium carbonate displayed nearly the same discharge performance both in fresh condition and after one week of storage at high temperature at 1000 mA or 2000 mA of discharge current.

Example 8

Figure 10:
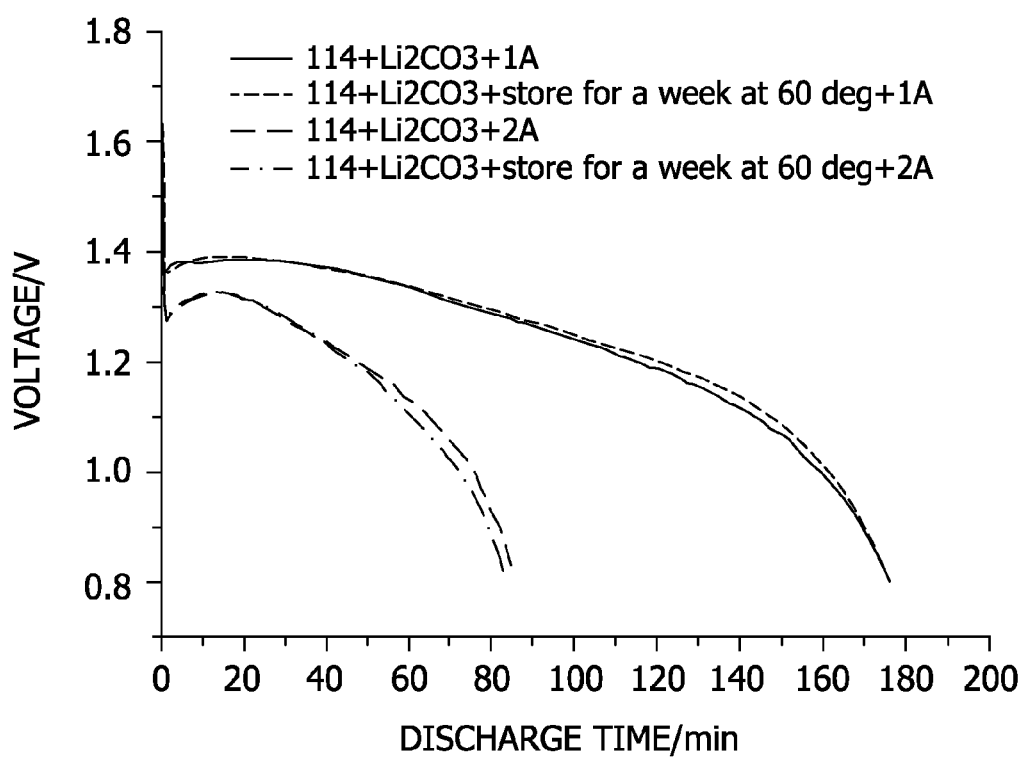
FIG. 10 is a graphical depiction of the discharge performance of exemplary cells of the present disclosure after one week of high temperature storage at 1000 mA or 2000 mA discharge current.

FIG. 10 displays the discharge performance of electrolyte 114 with lithium carbonate after one week of storage at high temperature (60° C.). As shown in FIG. 10, the batteries comprising electrolyte 114 and lithium carbonate displayed nearly the same discharge performance both in fresh condition and after one week of storage at high temperature at 1000 mA or 2000 mA of discharge current.

Example 9

Figure 11:
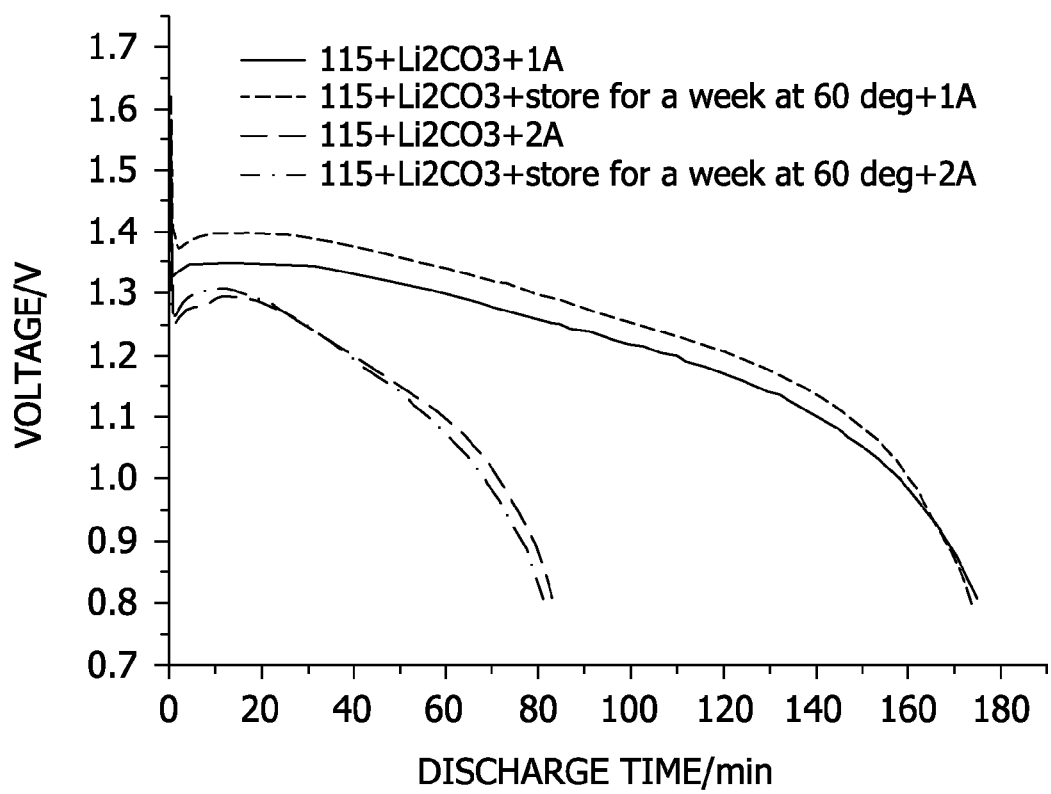
FIG. 11 is a graphical depiction of the discharge performance of exemplary cells of the present disclosure after one week of high temperature storage at 1000 mA or 2000 mA discharge current.

FIG. 11 displays the discharge performance of electrolyte 115 with lithium carbonate after one week of storage at high temperature (60° C.). As shown in FIG. 11, the batteries comprising electrolyte 115 and lithium carbonate displayed nearly the same discharge performance both in fresh condition and after one week of storage at high temperature at 1000 mA or 2000 mA of discharge current.

Example 10

Batteries including electrolytes 113 and 115 were tested in various electrical devices shown in Table 1 below. The performance of the batteries including the test electrolytes was compared to the battery containing the control electrolyte.

TABLE 1

| Testing | Unit | control | #113 | #115 |
|---|---|---|---|---|
| DSC-Initial, 1500/650 mW | Shots | 525 | 504 | 421 |
| DSC-1RT, 1500/650 mW | Shots | 505 | 477 | 431 |
| Photo, 1 Amp 10S/M 1H/D | Cycles | 903 | 940 | 926 |
| 1 Amp Continuous - Lot Release | Hours | 2.59 | 2.67 | 2.43 |
| Toy, 3.9 ohm 1H/D | Hours | 8.00 | 8.18 | 8.28 |
| CD/Game, 250 mA 1H/D | Hours | 10.7 | 10.79 | 10.48 |
| Toothbrush, 500 mA 2 m/15 m | Hours | 5.46 | 5.52 | 5.34 |
| Radio, 43 ohm 4H/D | Hours | 74.9 | 67.94 | 74.9 |
| Flashlight, 3.3 ohm lift | Hours | 6.23 | 6.66 | 6.41 |

As shown in Table 1, though depression in performance at a high rate of discharge (such as the DSC tests) occurred, batteries including the electrolytes 113 and 115 displayed improved performance at other rates. This was particularly true with respect to the battery containing electrolyte 113.

It is believed that at least a portion of these results can be ascribed to the sulfolane contained in both electrolyte 113 and 115. Sulfolane has a higher boiling point (285° C.) compared to other solvents in the control electrolyte (i.e., about 100° C.). As a result, the weight loss during high temperature storage of cells containing sulfolane was much less compared to that with the control electrolyte. Table 2 discloses the weight loss (wt. %) of the different electrolytes tested at 71° C. under a vacuum after storage for one to ten days.

TABLE 2

| Storage (days) | Control electrolyte | #113 (%) | #115 (%) |
|---|---|---|---|
| 1 | 0.0256 | 0.0133 | 0.0099 |
| 2 | 0.0477 | 0.0248 | 0.0238 |
| 3 | 0.066 | 0.0354 | 0.0302 |
| 4 | 0.0873 | 0.0317 | 0.0286 |
| 5 | 0.1042 | 0.0385 | 0.043 |
| 6 | 0.1305 | 0.0462 | 0.046 |
| 7 | 0.1509 | 0.0557 | 0.0532 |
| 8 | 0.1722 | 0.0592 | 0.0625 |
| 9 | 0.1926 | 0.0669 | 0.0738 |
| 10 | 0.2102 | 0.0724 | 0.0825 |

It is also believed that electrolyte 113 displayed better reliability than the control electrolyte because the flash point of the electrolyte 113 is higher than that of control electrolyte #45.

Example 11

Example 11 discloses various Crush and Impact testing that was conducted on sample AA batteries.

Crush Test Methods

The crush test (UL 1642 Required Test, and/or ANSI 18.3 Test) was performed on batteries preconditioned to the following parameters shown in Table 3:

TABLE 3

| Section | Pre-Test Condition | Sample Size | Storage Temperature |
|---|---|---|---|
| 6.1.a | * • Un-discharged | 5 | 20° C. ± 2° C. |
| 6.1.b | Discharge 250 mA to 25% DOD | 5 | 20° C. ± 2° C. |
| 6.1.c | • Discharge 250 mA to 50% DOD | 5 | 20° C. ± 2° C. |
| 6.1.d | Discharge 250 mA to 75% DOD | 5 | 20° C. ± 2° C. |
| 6.1.e | Discharge 250 mA to 100% DOD | 5 | 20° C. ± 2° C. |
| 6.1.f | Discharge 50 mA to 50% DOD | 5 | 20° C. ± 2° C. |

* UL 1642 Required Test
• ANSI 18.3 Test

The batteries were crushed between two flat surfaces in accordance with the following procedures: the crushing of the batteries was gradual with a speed of approximately 1.5 cm/s at the first point of contact, during which time a provision for voltage measurement is made. The force for crushing was applied by a hydraulic ram with a 1.25 inch (32 mm) diameter piston on the hydraulic ram. The crushing of the battery was continued until the first of the three options was reached:

1. The applied force reached 13 KN (a pressure of 17 MPa was reached). The applied force at this point is 3,000 lbs (13 KN); or
2. The voltage of the battery dropped by at least 100 mV; or
3. The battery is deformed by 50% or more of its original thickness.

Once the maximum pressure was obtained, the voltage dropped by 100 mV or more, or the cell was deformed by at least 50% of its original thickness, the pressure was released.

The batteries were crushed with their longitudinal axis parallel to the flat surfaces of the crushing apparatus and the crushing force was applied perpendicular to the longitudinal axis.

Each test battery was subjected to one crush only. The test samples were then observed for an additional six hours.

Impact Test Methods

The impact test (UL1642 Test, and/or ANSI 18.3 Test, and/or UN 38.3 Test) was performed on batteries preconditioned to the following parameters shown in Table 4:

TABLE 4

| Section | Pre-Test Condition | Sample Size | Storage Temperature |
|---|---|---|---|
| 6.2.a | * • Un-discharged | 5 | 20° C. ± 2° C. |
| 6.2.b | Discharge 250 mA to 25% DOD | 5 | 20° C. ± 2° C. |
| 6.2.c | # Discharge 250 mA to 50% DOD | 5 | 20° C. ± 2° C. |
| 6.2.d | Discharge 250 mA to 75% DOD | 5 | 20° C. ± 2° C. |
| 6.2.e | • Discharge 250 mA to 100% DOD | 5 | 20° C. ± 2° C. |
| 6.2.f | Discharge 50 mA to 50% DOD | 5 | 20° C. ± 2° C. |

* UL1642 Test
• ANSI 18.3 Test
UN 38.3

Prior to initiating the impact test, x-ray imaging was performed on each of the preconditioned batteries in order to determine the initial void volume of the battery inner windings.

Figure 12:
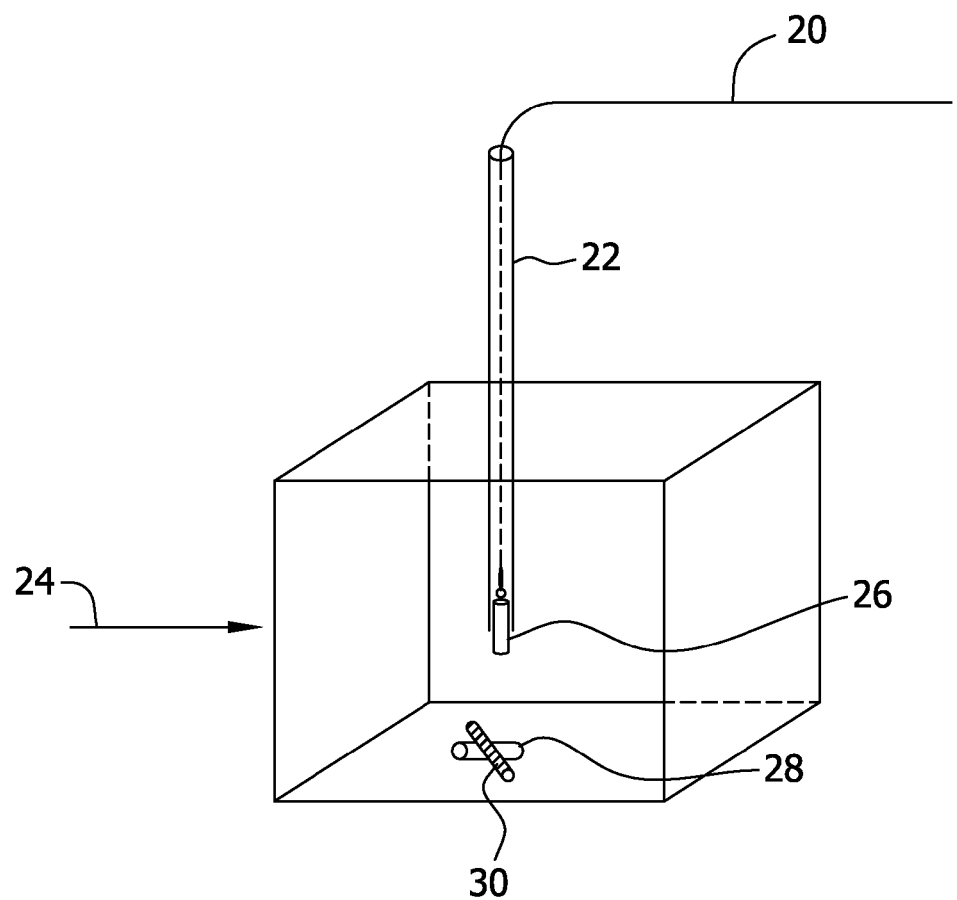
FIG. 12 is an exemplary depiction of an impact test performed on the cells of the present disclosure.

FIG. 12 displays the apparatus used for the impact testing. The impact test occurred in a steel impact chamber 24. The battery 28 was placed on a flat surface in the chamber 24. A ⅝ inch diameter bar 30 was then placed across the center of the battery 28. Through the use of a weight support rope 20, a 20-pound weight 26 was then dropped from a height of two feet through a containment tube 22 onto the battery 28.

The batteries were impacted with their longitudinal axis parallel to the flat surface and perpendicular to the longitudinal axis of the ⅝ inch (15.8 mm) diameter curved surface lying across the center of the test sample. Each sample battery was subjected to only a single impact.

The failure criteria for the battery samples was as follows: the chamber temperature shall not exceed 170° C. during testing and the battery sample shall not explode or catch fire (within six hours of completion of the testing).

Crush and Impact Test Results

The battery samples used for the crush and impact tests were cell size AA batteries. The electrode size dimensions, reference cell design, and new exemplary design in accordance with the present disclosure are described in Table 5:

TABLE 5

| Electrode Size | | Reference cell | Exemplary Cell Design |
|---|---|---|---|
| Cathode | Length (mm) | 310 | 287 |
| | Width (mm) | 40.5 | 39 |
| | Thickness (mm) | 0.165 | 0.165 |
| Anode | Length (mm) | 280 | 258 |
| | Width (mm) | 39 | 37 |
| | Thickness (mm) | 0.180 | 0.180 |
| Separator | Width (mm) | 44 | 44 |
| | Thickness (mm) | 0.02 | 0.02 |
| Void Volume (%) | | 26.7% | 34.0% |

The tested cells included different electrode sizes, as shown in Table 5, which operate to optimize the void volume. Also, other related modifications were made to minimize void volume changes during partial discharge. After optimizing the electrode sizes and cell configuration, the exemplary cell design in accordance with the present disclosure met or exceeded standard industry impact tests and crush tests.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

What is claimed is:

1. A primary electrochemical cell comprising: a cell housing; an anode comprising lithium; a cathode comprising a cathode active material, the cathode active material comprising
    iron disulfide;
    a separator disposed between the anode and the cathode; and,
    a non-aqueous electrolyte in fluid communication with the anode, cathode and separator, wherein said electrolyte comprises a solvent, a salt dissolved therein, and a pH-modifier, wherein said pH-modifier is an inorganic additive selected from the group consisting of ammonium carbonate and ammonium bicarbonate or a combination thereof in an amount from about 0.1% to about 5.0%, by weight of the electrolyte; and wherein the solvent comprises a mixture, by volume, of from about 55% to about 70% dioxolane, from about 30% to about 45% sulfolane and from about 0.1% to about 0.5% of 3,5-dimethylisoxazole.

2. The electrochemical cell of claim 1, wherein the salt is selected from the group consisting of lithium iodide, lithium nitrate, lithium bis(trifluoromethanesulfonyl) imide and mixtures thereof.

3. The electrochemical cell of claim 1, wherein the electrolyte has a water content of less than about 50 ppm.

4. The electrochemical cell of claim 1, wherein the salt comprises from about 0.75 to about 1M of lithium bis(trifluoromethanesulfonyl)imide.

5. The electrochemical cell of claim 1, wherein the cell further comprises a gasket seal material comprising polypropylene and a copolymer of ethylene-propylene-diene monomer.

6. The electrochemical cell of claim 1, wherein the cell further comprises a Positive Temperature Coefficient (PTC) device.

7. The electrochemical cell of claim 1, wherein the salt is lithium nitrate.

* * * * *